March 24, 1970 E F. THOMPSON 3,502,401
SIMULTANEOUS MULTIPLE-IMAGE DISPLAY

Filed July 7, 1966 3 Sheets-Sheet 1

INVENTOR.
E FRANCIS THOMPSON
BY
Hopgood & Calimafde
ATTORNEYS.

March 24, 1970     E F. THOMPSON     3,502,401
SIMULTANEOUS MULTIPLE-IMAGE DISPLAY Filed July 7, 1966     3 Sheets-Sheet 2

INVENTOR.
E FRANCIS THOMPSON
BY
ATTORNEYS.

United States Patent Office 3,502,401
Patented Mar. 24, 1970

3,502,401
SIMULTANEOUS MULTIPLE-IMAGE DISPLAY
E Francis Thompson, 231 E. 51st St.,
New York, N.Y. 10022
Filed July 7, 1966, Ser. No. 563,498
Int. Cl. G03b 37/06
U.S. Cl. 352—69
1 Claim

ABSTRACT OF THE DISCLOSURE

A photographic system for displaying several distinct moving pictures in a synchronized manner is described wherein a master film has a plurality of at least three separate non-overlapping movie tracks stored thereon in longitudinal tracks parallel to the longitudinal dimension of the film which is projected by a lens system onto a screen to provide at least three images thereon. The film is prepared by placing thereon a plurality of movie tracks in an anamorphic manner whereby the tracks are compressed in one dimension to enable their non-overlapping placement on the film. The placement of the tracks in one embodiment is accomplished by rotating the image 90° before storing onto the master film.

---

This invention relates to a display system for providing a plurality of simultaneous, synchronized motion picture images on separate screens or a single continuous screen. More particularly, this invention relates to photographic and projection systems in which the film images are stored or printed on a plurality of picture tracks on a single standard-gauge (width) film and are projected from a single projector in different directions to form separate image displays.

Plural screen motion pictures may display adjacent sections of a single scene, forming an extended panoramic view; they may also display images taken at different times or places but which bear a definite subject relationship to one another, for example different views of the same scene, or different stages of a process, or related scenes filmed in different locations. The viewer while observing all three or more screens forms a continuous comparison of the displayed images, since each image display is itself in motion that is related to the motion of the other displays. Each impression builds on the preceding impression so that the visual artist has an extraordinarily effective display technique and a powerful art form at his disposal.

Prior techniques for achieving multiple-image displays have required multiple synchronized projectors. Multiple projectors usually cannot be installed in ordinary theatres owing to lack of space in projection booths. In the few specially constructed threatres where such installations have been made, the initial cost is high, operating and maintainence cost are multiplied; even the most skilled projectionists make mistakes which result in the images on the separate screens being out of phase. Multiple image displays have therefore been hitherto confined to a very few installations and have been enjoyed by a very limited public.

In order to make this multple display art form widely and inexpensively available, I wish to use, for each multi-image display, a single standard projector and a single strand of standard gauge (or width) film. In this way theatres and projectors will always be available and multi-image displays will be available to the widest public.

It is therefore an object of this invention to provide an improved display system in which a plurality of motion picture images are positively synchronized and which uses a single standard commercial projector.

Still another object of this invention is to provide a display system using standard gauge (or width) movie film on which are printed at least three image tracks.

Another object of this invention is to provide a camera system for providing simultaneously a plurality of separate images on separate but adjacent or parallel image tracks within the frame area of a standard gauge film.

A further object of this invention is to provide a movie film projection system in which three or more movie tracks are stored or printed on a single film of standard gauge.

A still further object of this invention is to provide on a strand of standard gauge film a plurality of sequential images stored on separate portions of the film width and to alter the relative dimensions of the film images so that they fit on the standard film width.

Still another object of this invention is to provide an effective projection system having a plurality of movie tracks on a unitary standard gauge film having anamorphically compressed frames.

And another object is to provide a projection system in which a plurality of movie tracks are stored on a single film of standard gauge and have their respective frames rotated 90°.

Yet another object is to provide a system for projecting a plurality of images in which a single standard projector is used.

Another object of this invention is to provide a movie camera in which the light rays forming the image are rotated 90° before being exposed onto the film.

Briefly, the foregoing objects are achieved by providing a standard projector using a standard gauge movie film in which a plurality of longitudinal movie image tracks are stored parallel and adjacent to each other. The frames of each track are altered so that the plural tracks fit within the standard film width. In one aspect of the invention, the frames are anamorphically compressed, while in another aspect of this invention the frames are rotated so that the conventional longitudinal frame dimension (the height) spans part of the overall film width.

In yet another aspect of the invention, the frames are rotated and anamorphically compressed.

The above mentioned and other features and objects of this invention and the manner of attaining them will become more apparent and the invention itself will best be understood by reference to the following description of the embodiments of the invention taken in conjunction with the accompanying drawings wherein.

Figure 1:
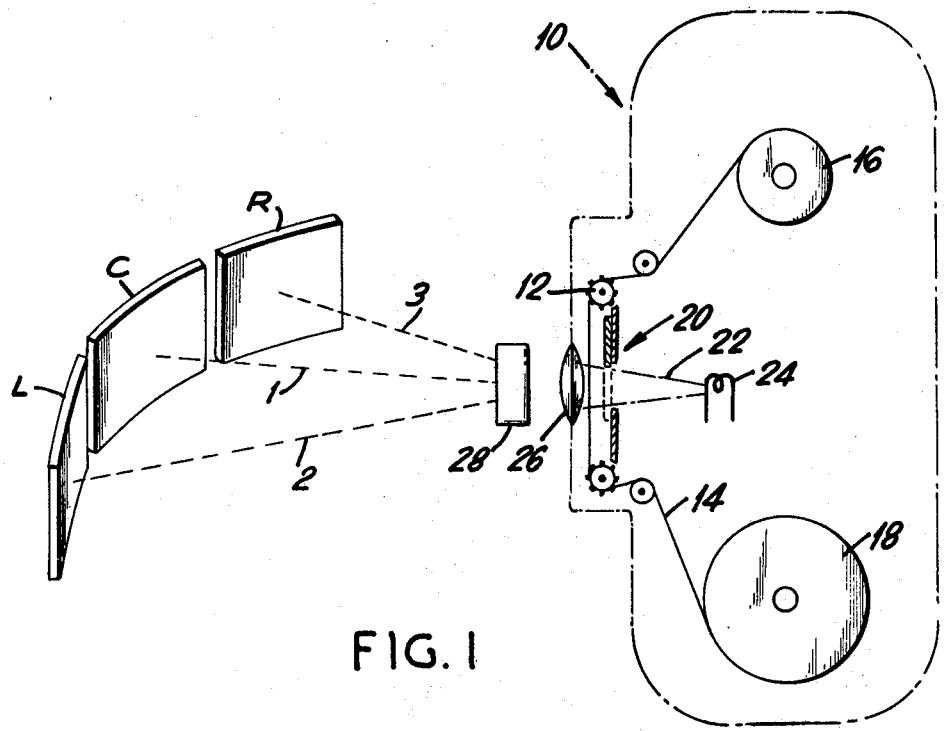
FIG. 1 is a diagram partly in perspective showing the projection system in which my invention is utilized to display three contiguous scenes.
Figure 2:
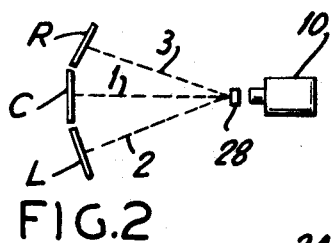
FIG. 2 is a top view diagrammatic of a modified projection system similar to that shown in FIG. 1.
Figure 1A:
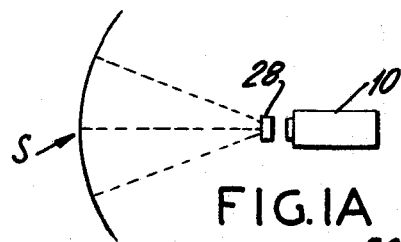
FIG. 1a is a diagrammatic top view of a modified projection system similar to that shown in FIG. 1.

Referring to FIG. 1 there is shown a standard motion picture projector 10 in which a standard gauge film 14 is driven by an intermittent sprocket drive 12 from a supply reel 16 to take up reel 18 past intermittent shutter means 20. Light beam 22 from light source 24 passes through the film and through standard projection lens system 26. An auxiliary lens system 28 projects the film image along directions 1, 2, and 3 onto screen L (left), C (center) and R (right). The screens are adjacent but not contiguous. The dimensions of each screen may be of standard academy proportions (approximately 3:4) or one or other of the wide screen shapes. The screens may be in the form of segments of a curved plan which, as shown in FIG. 1, is centred roughly at the projector. The centre of curvature may also be positioned closer to the screens than the projector is, or farther away. The screens, as shown in FIG. 2, may also be flat, and may be arranged at an angle to one another such that the plane of each is roughly normal to directions 1, 2 and 3 respectively. As shown in FIG. 1a, the images may also be projected on a single screen S of a size equal to the three screens of FIG. 1.

Figure 3:
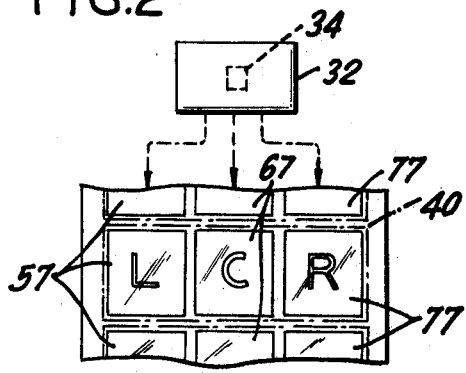
FIG. 3 is a diagrammatic illustration of three anamorphically squeezed frames on a single strand of standard film.

In order to provide three separate pictures, film tracks identified by the indicia left, center and right, FIG. 3 are stored on printed on a single strand of standard gauge film. The film tracks are conventional 35 mm. width, the frame of each track is anamorphically squeezed and spherically reduced as illustrated in FIG. 3 so that three film tracks fit within the limited film width. In a preferred embodiment, the frames illustrate anamorphic squeeze of 2:1 consequent upon an aspect ratio of the original image of 3:4 which is common. In other instances, the squeeze will depend upon the aspect ratio then used.

Anamorphic lens systems are well known in the art and have the common characteristic of changing one of the dimensions of images passed through them, by squeezing and stretching. Anamorphic lenses may be used on cameras, on projectors or on optical printers.

Anamorphic squeezing involves the technique of reducing (a) only one of the dimensions of a film image or (b) reducing one dimension of the film image while simultaneously either reducing or enlarging the other dimension of the same image by different amounts. The technique or anamorphic squeezing is well known in the art and need not be described further. It is to be understood that when any image is anamorphically squeezed so as to be stored on a film a complementary anamorphic lens must be used in projection to restore the image to its original proportions.

In FIG. 3, the 3 original 35 mm. strands are passed through an optical printer 32 fitted with a lens (not shown) which enlarges the image slightly and an anamorphic lens system 34 which reduces the horizontal dimension, so that the three original 35 mm. images just fit side by side within the 65/70 mm. frame of which the full area 40 is indicated in broken line. It is to be understood that, in projection a complementary anamorphic lens system is used to restore images 57, 67 and 77 to their original proportions.

Figure 4:
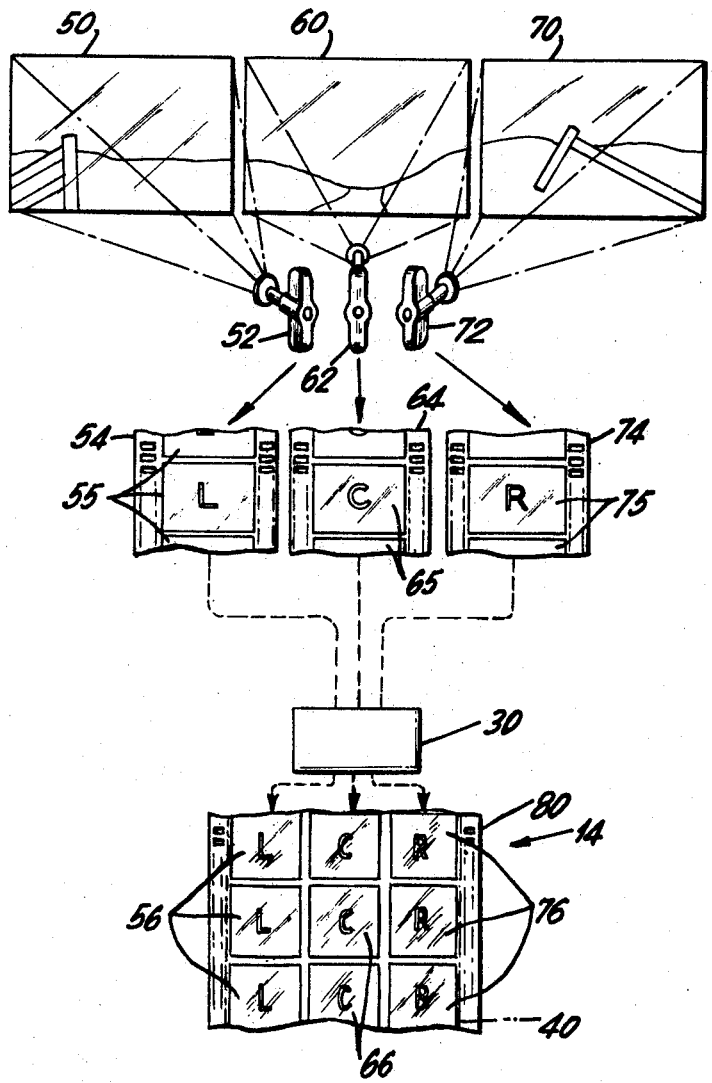
FIG. 4 is a generalized flow diagram illustrating the principles of my invention.

FIG. 4 shows, diagrammatically, a technique for producing one form of film 14 for use with the projection system shown in FIG. 1. Adjacent portions 50, 60 and 70 of a scene are photographed by 3 synchronized cameras 52, 62 and 72 onto separate strands of standard 35 mm. film 54, 64 and 74, where they appear as, for example, images 55, 65 and 75. The separate film strands may then be passed through an optical printer 30 in which height and width characteristics of the images are altered disproportionately and the images are reproduced side by side as images 56, 66 and 76 within the frame area 40 of a single strand of 65/70 mm. film 80. In one embodiment the images are spherically enlarged so that the height of the image occupies the frame height and then the images are anamorphically compressed.

Figure 5:
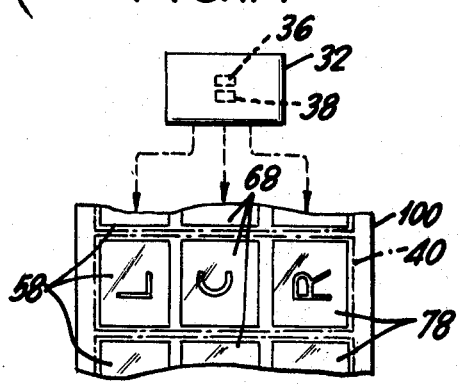
FIG. 5 is an illustration of another embodiment of my invention.

FIG. 5 illustrates a further embodiment of the invention, in which the three original 35 mm. strands are passed through an optical printer 34 fitted with a lens system 38 which rotates the images through 90° before printing them side by side, as images 58, 68 and 78 in the frame area 40 of a 65/70 mm. film strand 100. In projection, a complementary lens system would be used to rotate the images back to normal. If necessary, an auxiliary anamorphic lens system 36 may be used if the twisted images would fall outside area 40.

It is understood that a projection system for the master will utilize a complementary lens system so as to twist the image back to normal. Twisting optics may comprise a roof mirror system, dove prism or other arrays of mirrors, lens and reflectors. When color film is used, those skilled in that art will provide additional corrective optics.

While the twisting technique has certain advantages, the anamorphic compression technique appears to be the preferred technique for achieving my desired objective.

Figure 6A:
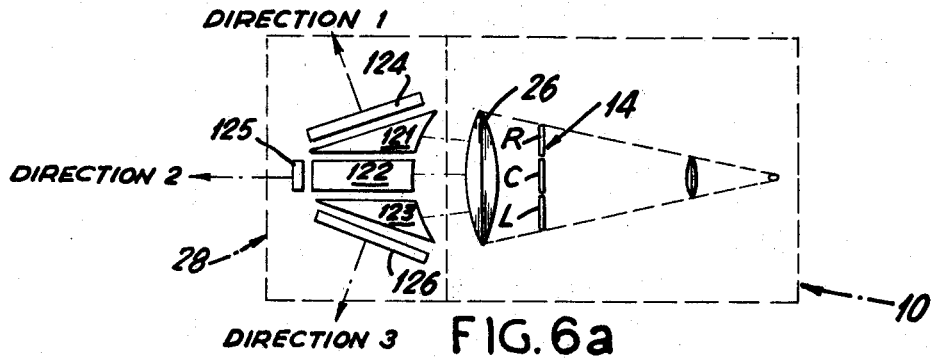
FIG. 6a and 6b are various illustrations of the projector which might be utilized in my invention.

Referring now to FIG. 1, the projector 10 is illustrated diagrammatically as having a light source 13 and a projection lens 26. The auxiliary lens system shown diagramatically at 28 in FIG. 1 directs the image display in the desired directions and restores the original proportions of the displayed images. Such auxiliary lens elements are not novel per se except as part of the novelty of this combination and only constitute one element of this invention. One form of this auxiliary lens shown in FIG. 6a comprises a series of prisms 121, 122 and 123 which divert the light rays pasing through the respective right, center and left frames along the directions 1, 2 and 3 and complementary anamorphic lens elements 124, 125 and 126 provide correcting optics. It will be understood that the prism arrangement shown is an exploded diagrammatic view, while in practice I prefer to locate the prisms closely in contact with the outer lens 26 of the projector.

The spaces between adjacent film images such as 57, 67 and 77 in FIG. 3 and 56, 66 and 76 in FIG. 4 correspond to the spaces between the separate screens shown in FIG. 1. When the images are projected onto a single screen, as shown in FIG. 1a, the spaces between adjacent film images provide separations between the projected images.

Prismatic lenses may be appropriately used if the image rays must be parallel within the auxiliary lens. If the film images are twisted, conventional complementary twisting optics are necessary for projection to place the images right side up.

Figure 6B:
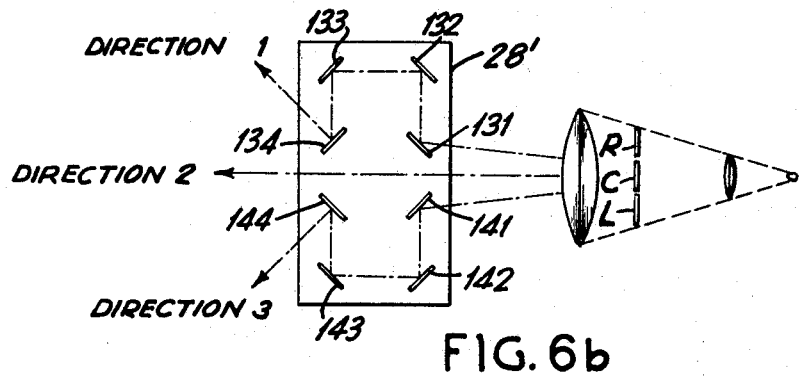

Another exemplary projection lens system 28', FIG. 6b comprises a series of mirrors or reflectors 131, 132, 133 and 134 which reflect a projected image from the right frame along direction 1. Another set of mirrors 141, 142, 143 and 144 serve a corresponding purpose for the light rays emanating from the left frame. No such mirrors are necessary for the center frame since that image may be projected without obstruction to its intended screen. It may also be understood that in front of the auxiliary lens complementary anamorphic lenses may be positioned should the film of FIG. 3 be used and that other auxiliary lenses may be used to reverse the image twist should the film of FIG. 5 be utilized.

Figure 7A:
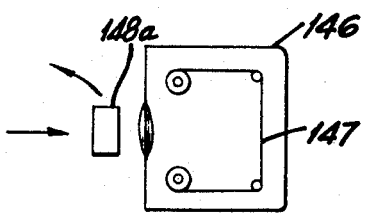
FIG. 7a and 7b are diagrammatic views of a camera which might be utilized in accordance with the principles of my invention.
Figure 7B:
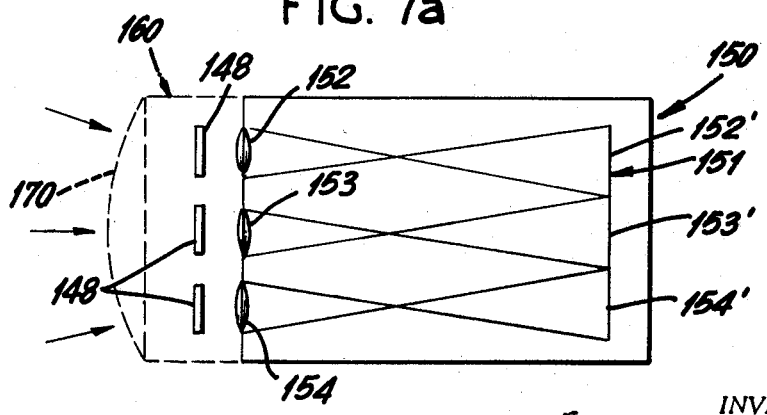

In another aspect of this invention, FIG. 7a and 7b there is provided a camera for (1) panoramically photographing a relatively wide scene with a lens system dividing the subject scene into three separate sections and (2) optically rotating each image section 90° for exposure onto the film. As shown in FIG. 7b, the camera 150 has a film 151 in which three separate frames may be photographed at one time. The camera mechanism, the shutters, the film drive and the like are conventional except for three separate primary lenses 152, 153 and 154 which produce images 152', 153' and 154' respectively on the film 151. The auxiliary lens means 160 twists the image 90°, as heretofore mentioned. The auxiliary lens may be comprised of series of separate lens 148 and described in connection with FIG. 6a for rotating the image. The dotted line 170 is intended to suggest that the lens 152, 153 and 154 and their associated respective auxiliary lens elements may be positioned in an arcuate path or in other positions so as to view in different or nonparallel directions. Direct anamorphic exposures utilizing squeezed side by side images may also be obtained by a camera as shown in FIG. 7a using anamorphic lenses indicated generally at 148a.

There has been described a camera system using a unique master film, a novel camera and a novel projection system. The particular embodiments selected illustrate the basic principles of my invention. Such illustrations are exemplary of the inventive concepts and means pointed out in my claims.

What is claimed is:

1. A projection system for displaying several distinct moving pictures in synchronized manner, comprising
    a master film having a plurality of at least three separate non-overlapping movie tracks stored thereon in longitudinal adjacently spaced tracks parallel to one another and the film longitudinal dimension, with each track composed of sequential related image frames,
    means for illuminating the images on said film,
    a lens system aligned with the illumination passing through the film and including a first direction reflecting lens system and a second direction reflecting lens system with said reflecting lens systems spaced from one another to provide a space therebetween for the passage of unreflected illumination from the film with each of said reflecting lens systems composed of a first reflector directing a selected portion of the film illumination generally transverse to the unreflected illumination, a second reflector spaced from the first reflector to intercept the transverse reflected illumination to direct it generally parallel to the unreflected illumination, a third reflector spaced from the second reflector in a direction generally parallel to the unreflected illumination to intercept the reflected illumination from the second reflector and return it generally towards the unreflected illumination and a fourth reflector spaced between the third reflector and the unreflected illumination to direct the returning illumination in a direction away from the film and at an angle with the unreflected illumination.

References Cited

UNITED STATES PATENTS

| | | | |
|---|---|---|---|
| 1,489,988 | 4/1924 | Dickinson. | |
| 2,977,844 | 4/1961 | Winkler | 352—71 |
| 3,038,370 | 6/1962 | Nakamatsu | 352—70 |
| 3,055,265 | 9/1962 | Smith | 352—70 |

FOREIGN PATENTS

| | | |
|---|---|---|
| 282,422 | 10/1928 | Great Britain. |
| 1,018,776 | 10/1952 | France. |

JULIA E. COINER, Primary Examiner

U.S. Cl. X.R.

352—83